United States Patent
Dolby et al.

(10) Patent No.: US 10,942,708 B2
(45) Date of Patent: Mar. 9, 2021

(54) GENERATING WEB API SPECIFICATION FROM ONLINE DOCUMENTATION

(71) Applicant: INTERNATIONAL BUSINESS MACHINES CORPORATION, Armonk, NY (US)

(72) Inventors: Julian T. Dolby, Bronx, NY (US); John E. Wittern, New York, NY (US); Jinqiu Yang, Waterloo (CA); Annie T. T. Ying, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 345 days.

(21) Appl. No.: 15/403,150

(22) Filed: Jan. 10, 2017

(65) Prior Publication Data

US 2018/0196643 A1    Jul. 12, 2018

(51) Int. Cl.
G06F 8/10       (2018.01)
H04L 29/08      (2006.01)
G06F 16/958     (2019.01)
G06F 8/36       (2018.01)

(52) U.S. Cl.
CPC .................. *G06F 8/10* (2013.01); *G06F 8/36* (2013.01); *G06F 16/986* (2019.01); *H04L 67/025* (2013.01); *H04L 67/02* (2013.01); *H04L 67/34* (2013.01)

(58) Field of Classification Search
CPC ...................... G06F 8/00–78; G06F 9/547–548
See application file for complete search history.

(56) References Cited

U.S. PATENT DOCUMENTS

| | | | |
|---|---|---|---|
| 6,317,867 B1 * | 11/2001 | Elnozahy | G06F 8/4434 717/107 |
| 8,347,276 B2 | 1/2013 | Schadow | |
| 8,504,543 B1 * | 8/2013 | Andreessen | H04L 67/02 707/705 |

(Continued)

OTHER PUBLICATIONS

Danielsen, Peter J., and Alan Jeffrey. "Validation and interactivity of web API documentation." 2013 IEEE 20th International Conference on Web Services. IEEE, 2013. (Year: 2013).*

(Continued)

*Primary Examiner* — Doon Y Chow
*Assistant Examiner* — Joanne G Macasiano
(74) *Attorney, Agent, or Firm* — Intelletek Law Group, PLLC; Gabriel Daniel, Esq.

(57) ABSTRACT

A tool that automatically generates a web API specification from a web API documentation is provided. The tool extracts a base uniform resource locator (URL) string from the received documentation by identifying URL strings in the documentation that are valid web application programming interface (API) calls. The tool infers path templates by identifying and clustering path expressions in the documentation that invoke the same URL endpoints. The tool extracts hypertext transfer protocol (HTTP) request type and query parameters associated with the inferred path templates. The tool generates a specification that includes the extracted base URL, the inferred path templates, the extracted HTTP request types, and the extracted query parameters.

20 Claims, 15 Drawing Sheets

(56) References Cited

U.S. PATENT DOCUMENTS

| | | | | |
|---|---|---|---|---|
| 9,015,730 B1* | 4/2015 | Allen | ............... | G06F 9/541 |
| | | | | 719/310 |
| 2005/0097314 A1* | 5/2005 | Matsushima | ........... | G06F 21/33 |
| | | | | 713/156 |
| 2007/0016897 A1* | 1/2007 | Todd | ............... | G06F 9/5055 |
| | | | | 717/143 |
| 2013/0138655 A1* | 5/2013 | Yan | ............... | G06F 16/337 |
| | | | | 707/738 |
| 2014/0373148 A1* | 12/2014 | Nelms | ............ | H04L 63/1441 |
| | | | | 726/23 |
| 2018/0095810 A1* | 4/2018 | Choudhary | ............. | G06F 9/547 |

OTHER PUBLICATIONS

Rodríguez, Rolando, et al. "Extracting models from web API documentation." International Conference on Web Engineering. Springer, Berlin, Heidelberg, 2012. (Year: 2012).*

Sohan, Sheikh Mohammed, Craig Anslow, and Frank Maurer. "Spyrest: Automated restful API documentation using an HTTP proxy server (N)." 2015 30th IEEE/ACM International Conference on Automated Software Engineering (ASE). IEEE, 2015. (Year: 2015).*

Hao Zhong et al., "Inferring Resource Specifications from Natural Language API Documentation," 24rd IEEE/ACM International Conference on Automated Software Engineering, Auckland, New Zealand, Nov. 16-20, 2009.

Rahul Pandita et al., "Inferring Method Specifications from Natural Language API Descriptions," ICSE '12 Proceedings of the 34th International Conference on Software Engineering, pp. 815-825, Zurich, Switzerland; Jun. 2-9, 2012.

* cited by examiner

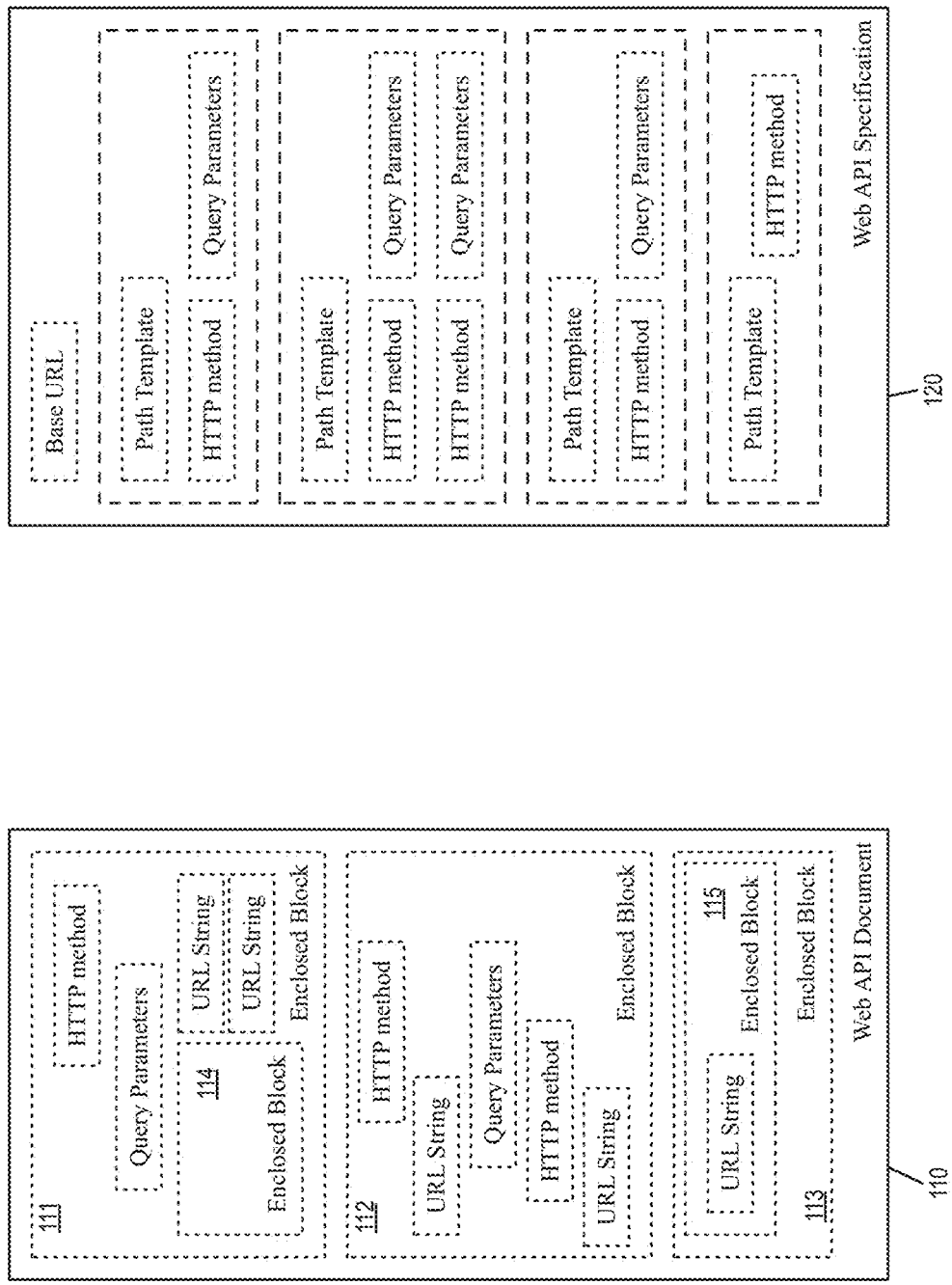

Media Endpoints

- (GET) /media/ media-id
  Get information about a media object
- (GET) /shortcode/ shortcode
  Get information about a media object
- (GET) /media/search
  Search for recent media in a given area
- (GET) /media/ media-id `(https://api.instagram.com/v1/media/{media-id}?access_token=ACCESS-TOKEN)` RESPONSE Get information about a media object. Use the type field to differentiate between image and video media in the response. You will also receive the user_has_liked field which tells you whether the owner of the access_token has liked this media The public_content permission scope is required to get a media that does not belong to the owner of the access_token.

REQUIREMENT
Scope: public_content

PARAMETERS
ACCESS_TOKEN    A valid access token
...

FIG. 2

```
swagger: '2.0'
schemes:            310
  - https
host: api.instagram.com
basePath: /v1
...
paths:              320
  /media/{media-id}:
    get:
      description: Get information about a media object
      parameters:   325
        - description: The type field differentiate between image and video media.
          in: path
          name: type
          required: true
          type: string
      ...
      responses:
        '200':
          description: OK
          schema
          ...
```

GENERATING WEB API SPECIFICATION FROM ONLINE DOCUMENTATION

BACKGROUND

Technical Field

The present disclosure generally relates to generating structured specifications for computer programming based on unstructured documentations written in natural languages.

Description of the Related Art

Programmers write applications using a growing variety of publicly accessible web services. Applications can access and/or request these publicly accessible web services by invoking their corresponding web Application Programming Interfaces (web APIs).

SUMMARY

Some of embodiments of the disclosure provide a tool that automatically generates a web application programming interface (API) specification from web API documentations. The tool extracts a base uniform resource locator (URL) string from the received documentation by identifying URL strings in the documentation that are valid web application programming interface (API) calls. The tool infers at least a first path template by identifying and clustering path expressions in the documentation that invoke the same URL endpoints. The tool extracts a hypertext transfer protocol (HTTP) request method and a query parameter associated with the first path template. The tool generates a specification that includes the extracted base URL, the inferred first path template, the extracted HTTP request types, and the extracted query parameter.

In some embodiments, the tool receives a web API documentation and extracting path expressions from the received documentation. Each path expression includes a plurality of path segments. The tool groups extracted path expressions into clusters. A first path expression and a second path expression are grouped into a same cluster when a distance between the first and second path expressions is within a threshold distance. The distance between the first and second path expressions is determined based on differences between the path segments of the first path expression and the path segments of the second path expression at each path segment position. The tool then infers a path template from each cluster and generates a web API specification that includes the inferred path template.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 1a-c illustrates an example documentation-to-specification (Doc2Spec) tool that crawls a web API documentation to extract information and generates a web API specification based on the extracted information.

FIG. 2 illustrates an example web API documentation.

FIG. 3 illustrates an example web API specification with information extracted from the web API documentation.

DETAILED DESCRIPTION

Figure 1A:
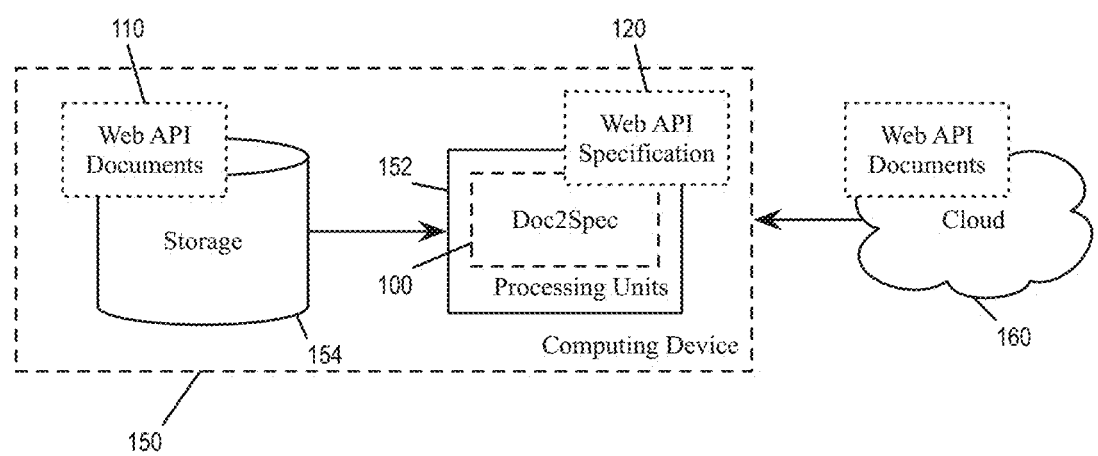

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Applications increasingly use web Application Programming Interfaces (hereinafter web APIs) to programmatically interact with services. For example, Twitter and Facebook expose rich social networks through their APIs, Instagram enables programmatic access to millions of photos, or the IBM Watson APIs make diverse natural language capabilities accessible to applications. However, application developers using web APIs face multiple challenges: APIs need to be discovered, selected, and understood to be correctly invoked, and these APIs are under the control of independent providers who can change the services in a way that breaks client code. Furthermore, even for supposedly standardized notions such as the APIs' Uniform Resource Locator (URL) structures, Hypertext Transfer Protocol (HTTP) methods, or status codes, the semantics can differ across APIs. For the specifics on how APIs should be used, application developers often depend on online documentations, many of which are semi-structured Hypertext Markup Language (HTML) based pages.

Various formats of API specifications attempt to unify the description of URL templates, HTTP request types, headers, parameters, and data required to interact with web APIs. For example, the OpenAPI specification is a machine understandable format, which enables, among other things, automatic synthesis of API and client code in various languages and generation of consistent, interactive API documentations for human developers. However, creating a specification requires manual effort, and then the specification must be kept consistent with the API implementation and its human-readable documentation.

Some embodiments of the disclosure provide a document-to-specification ("Doc2Spec") tool for extracting specifications from web API documentation pages. Given a documentation page for an API in an arbitrary format or in a natural language, the tool crawls the documentation pages and then extracts a base URL, path templates, HTTP request types, and query parameters. The web AP documentation page may include free-form text with arbitrary HTML structures. The tool crawls the documentation pages and then uses a set of machine learning techniques to extract the base URL of an API (e.g., https://api.github.com), the path templates (possibly containing path parameters, e.g., /users/{user-name}/org), HTTP request types (e.g., GET, POST), and query parameters (e.g., ?order=desc). The tool uses classifiers and a hierarchical clustering algorithm to extract information about the URL structure of an API from the documentation, and searches the context of the found pieces of information for related entities, such as HTTP request types and query parameters. Based on the extracted base URL, path templates, HTTP request types, and query parameters, the tool automatically generates and maintains web API specifications that has sufficient information for performing successful API requests.

The generated specification based on extracted information can also be used to check the consistency between documentation and implementation, for example through automatic invocations of the APIs based on the extracted specifications. For API consumers, the extracted specifications can be used to synthesize client code in languages of their choice.

FIG. 1a-c illustrates an example documentation-to-specification (Doc2Spec) tool 100 that crawls a web API documentation to extract information and generates a web API specification based on the extracted information. The tool 100 extracts information from a web API documentation 110 and generates a web API specification 120.

As illustrated in FIG. 1a, the Doc2Spec tool 100 is a program operated by a computing device 150. The computing device can be a mainframe, a workstation, a desktop computer, a laptop computers, a tablet computer, a smartphone, or any electronic device capable of executing instructions, whether in firmware or in software. The computing device 150 is in communication with the Internet 160 through wireless and/or wired communications mediums. The computing device 150 includes one or more processing units (e.g., processors) 152 that are configured by instructions stored in the computing device 150 to perform the operations of the Doc2Spec tool 100. The set of processing units 152 executing the tool accesses or receives the web API documentation 110, which can be stored at a local storage device 152 of the computing device 150, or at a remote storage over the Internet 160. The tool 100 extracts information from the web API documentation 110 and generates the web API specification 120.

FIG. 1b conceptually illustrates the content of the web API documentation 110 and FIG. 1c conceptually illustrates the content of the web API specification 120. The web API documentation 110 includes information for how to access the services provide by a URL host. The documentation 110 may be in a non-standardized, arbitrary format. Such information includes URL strings, HTTP request types, and query parameters. In some embodiments, the web API documentation is a rendered document based on HTML, which has enclosure indicators such as matching tags or brackets that enclose text and information into various blocks. As illustrated, the web API documentation 110 includes numerous instances of URL strings, HTTP request types, query parameters, and other information that are enclosed by various enclosed blocks 111-115. An enclosed block may also enclose one or more nested enclosed blocks (e.g., 114 nested under 111; 115 nested under 113). The placement of the URL strings, HTTP request types, and query parameters are according to an arbitrary format that is not known to the Doc2Spec tool 100.

The generated web API specification 120 includes a base URL 121, several path templates 122-125. The specification 120 associates each path template with one or more HTTP request types and/or query parameters. The Doc2Spec tool extracts the base URL 121, the path templates 122-125, and their associated HTTP request types and query parameters from the web API document 110 and stores the extracted information in the web API specification as web API specification. Unlike the web API document 110 which is in an arbitrary format, the Doc2Spec tool can generate the web API specification 120 in any formal web API specification format such as OpenAPI (or Swagger), API Blueprint, or RAML, or any other format. The format of the specification 120 can be determined by the programming of the Doc2Spec tool or selected by the user of the tool.

A URL of a Web API request contains the base URL and the relative path of the corresponding endpoint. More formally, a base URL is a common prefix of all URLs for web API invocations, excluding other URLs such as documentation pages. In OpenAPI specifications, a base URL is constructed via three fields: a scheme (e.g., https), the host (e.g., api.instagram.com), and optionally a base path (e.g., /v1). In many APIs, the base URL is the longest common prefix of all the URLs for invoking the web API. (For some other APIs, the longest common prefix may not be the base URL. For example, for one of Microsoft's® API, the longest common prefix is https://management.azure.com/subscriptions while the actual base URL is https://management.azure.com, because/subscriptions is defined to be part of the endpoint paths. Whether a base URL is indeed the longest common prefix is a decision of the API provider.)

A path template defines fixed components of a URL as well as ones to be instantiated dynamically. For example, in a path template/users/{userId}/posts, {userId} would be instantiated with a concrete value of a user ID before performing a request. A path parameter is typically denoted via enclosing brackets (i.e., "{ }", "[ ]", "< >", or "( )") or a prefix ":".

There are at least two types of descriptions associated with each path template: HTTP request types and query parameters. The HTTP request type (also known as HTTP method) reflects the type of interaction to be performed on a resource exposed by a web API, such as GET and POST. The query parameters encode data in a request as key-value pairs within the URL. They are appended to an URL following a "?". Each query parameter key and its value are separated by a "=", while multiple key-value pairs are separated by a "&".

FIG. 2 provides an example web API documentation from which the Doc2Spec tool 100 extracts information and generates a web API specification. The figure illustrates a rendered document 200 that includes URL strings 211, 212, 213, 214, and 215. The URL strings 211-215 are all path expressions for specifying paths to URL endpoints. The URL string 215 is a valid web API call that may include the base URL. The URL string 215 also includes a sample query parameter 216. The document 200 also includes several HTTP request types 221-224. The positions of the HTTP request types 221-214 in the rendered document 200 suggest association with some of the URL strings 211-214.

Base URLs are often not explicitly mentioned in the documentation. Rather, base URLs are often included as part of depicted examples of Web API requests, such as the URL string 215. Thus, Doc2Spec infers the base URL from all the URL strings provided in the Web API documentation.

FIG. 3 provides an example web API specification generated by the Doc2Spec tool 100 in OpenAPI format. The figure illustrates an example web API specification 300 with information extracted from the web API documentation 200. The example web API specification 300 is in Swagger 2.0 (OpenAPI) format. It includes a listing of the extracted base URL 310, a path template 320, a HTTP request type 325 ("get") associated with the path template 320.

Figure 4:
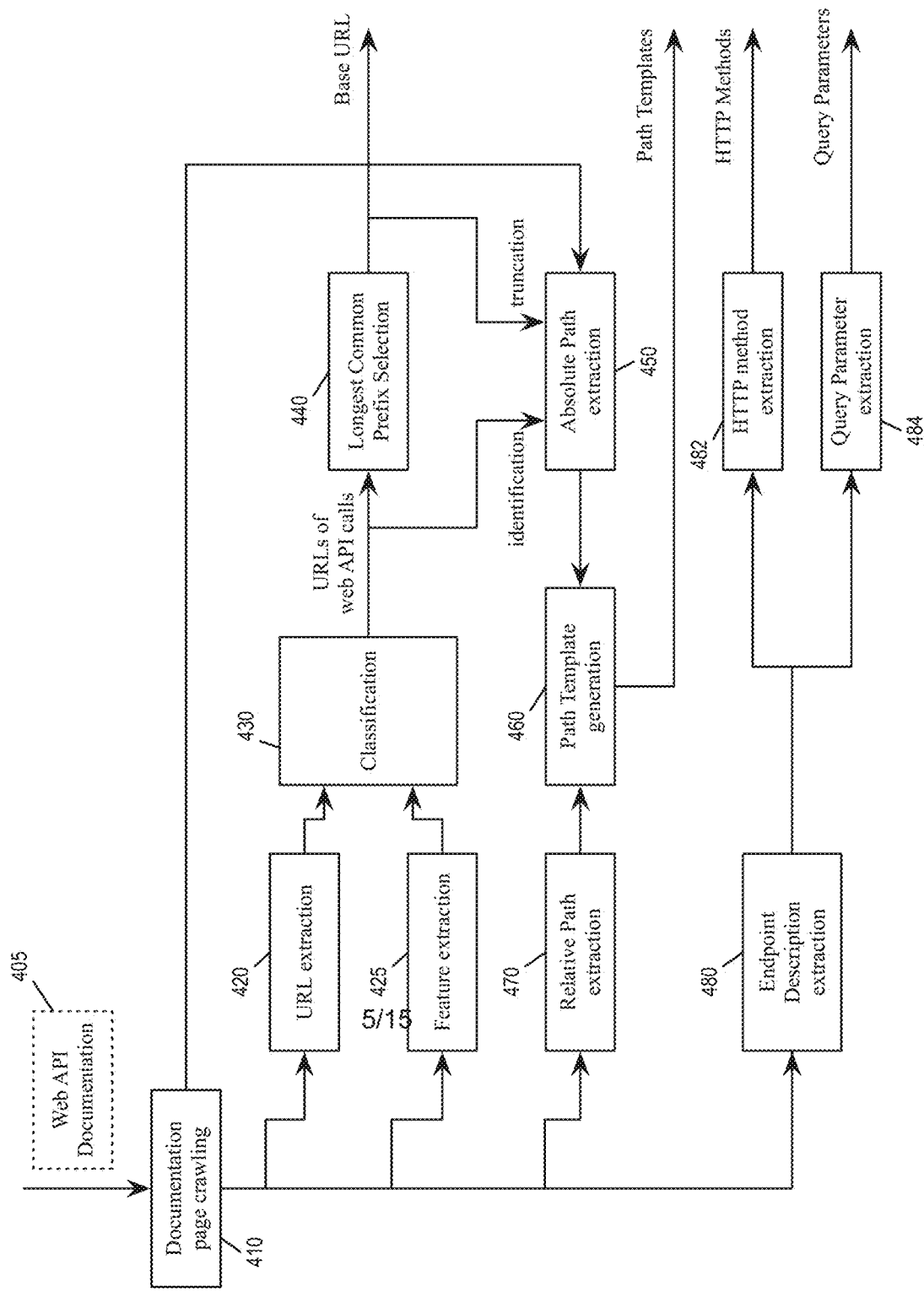
FIG. 4 illustrates a block diagram of the various modules in the Doc2Spec tool for extracting or inferring the base URL, path templates, HTTP request types, and query parameters, consistent with an exemplary embodiment.

The Doc2Spec tool employs a set of techniques to extract or infer the base URL, path templates, HTTP request types, and query parameters from a documentation. In some embodiments in which the Doc2Spec tool is implemented as software or firmware being executed by one or more processing units (e.g., processors), these various techniques are implemented as software modules or sets of instructions. In some embodiments in which the Doc2Spec tool is implemented as digital hardware such as an integrated circuit (IC), these various techniques are implemented by sets of digital circuits. FIG. 4 illustrates a block diagram of the various modules in the Doc2Spec tool 100 of FIG. 1 for extracting or inferring the base URL, path templates, HTTP request types, and query parameters, consistent with an exemplary embodiment. The figure also shows the data flow between these modules as the Doc2Spec tool 100 extracts information from a web API documentation 405.

As illustrated, the Doc2Spec tool 100 includes a documentation page crawling module 410, a URL extraction module 420, a feature extraction module 425, a classification module 430, a longest common prefix selection module 440, an absolute path extraction module 450, a path template generation module 460, a relative path extraction module 470, an endpoint description extraction module 480, a HTTP request type extraction module 482, and a query parameter extraction module 484. Though the modules 410-484 are illustrated as being separate, some of the modules can be combined into a single module. For example, the functionalities of the relative path extraction module 470 and the absolute path extraction module 450 can be merged into one path extraction module.

The documentation page crawling module 410 crawls the web API document 405 to obtain complete documentation sources for an API. The crawler 410, starting from a seed page of the web API documentation 405, iteratively downloads all linked subpages.

To extract the base URL, The URL extraction module 420 extracts the base URL by extracting all path expressions that can represent a web API call from the crawled documentation pages. The classification module 430 leverages machine learning classification to determine for each candidate URL, whether or not it is likely to represent an invocation to the documented web API. This determination is based on features of the document 405 (and of the candidate URLs) that are extracted by the feature extraction module 425. The longest common prefix selection module 440 then selects the longest common prefix of these URLs as the base URL.

Path expressions of endpoints are presented in a documentation page as absolute URLs or relative URLs. Absolute URLs describe the whole URL used to perform an API request, for example, https://api.github.com/repos/vmg/red-carpet/issues. When identifying base URLs, the Doc2Spec tool already extracts the absolute URLs and can obtain paths of endpoints by truncating the already determined base URL. Web API documentation pages may also provide relative path components without the base URL, for example, /users/repo. Unlike absolute URLs, which often include links to external resources, relative paths often describe API endpoints. The relative path extraction module 470 extracts URL strings that are already expressed as relative URLs directly from the web API documentation 405. The absolute path extraction module 450 receives the path expressions determined to be likely valid Web API calls from the classification module 430 (these are necessarily absolute URLs). The absolute path extraction module 450 then converts the absolute URLs into relative URLs by removing or truncating the base URL from absolute URLs. Based on the relative URLs extracted by the relative path extraction module 470 and the absolute URLs extracted by the absolute path extraction module 450, the path template generation module 460 applies an agglomerative hierarchical clustering algorithm to infer path templates by identifying path parameters and aggregating paths from the extracted path expressions (relative URLs and absolute URLs).

To extract HTTP request types and query parameters, the endpoint description extraction module 480 locates the descriptions of the inferred templates. These descriptions are co-located with the URL paths in the documentation. The HTTP request type extraction module 482 and the query parameter extraction module 484 in turn extract the HTTP request type(s) and the query parameters from the descriptions of the inferred templates.

Extracting Base URL

Figure 5:
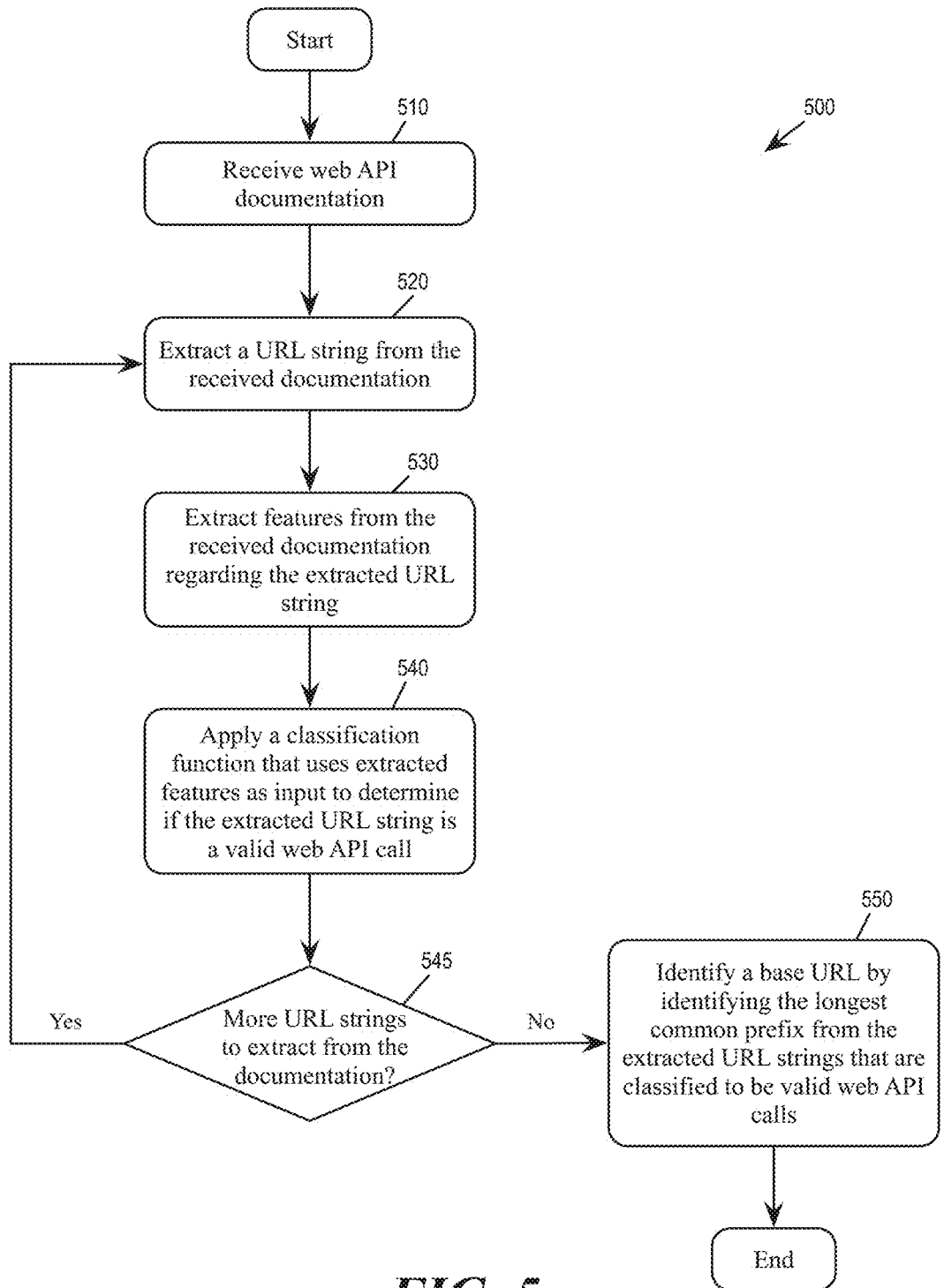
FIG. 5 conceptually illustrates an example process for extracting the base URL from a web API document.

FIG. 5 conceptually illustrates an example process 500 for extracting the base URL from a web API document. In some embodiments, one or more processing units of a computing device implementing the Doc2Spec tool (e.g., the computing device 150) perform the process 500. In some embodiments, the Doc2Spec tool 100 performs the process 500 when the tool's documentation page crawling module 410, URL extraction module 420, feature extraction module 425, classification module 430, and longest common prefix selection module 440 perform their respective operations.

The Doc2Spec tool starts the process 500 by receiving (at 510) web API documentation. The tool can receive the documentation from a storage in the computing device or from the Internet. In some embodiments, the tool receives the API documentation by starting from a seed page of the web API document and iteratively downloads all linked subpages.

The Doc2Spec tool extracts (at 520) a URL strings from the received documentation. The extracted URL string is a candidate path expression that may contain the base URL. A URL string may be a standard URL (according to the World Wide Web Consortium (W3C) definition) or a URL containing path parameters enclosed in "{ }", "[ ]", "( )", or "< >". (In some embodiments, the Doc2Spec tool does not extract URL links within "href" attributes of link tags, nor inside <script> tags. URLs that represent web API calls are one of the main contents in a documentation page to be communicated to the readers. Hence, such URLs tend to be rendered in the documentation rather than as links or in scripts. Even excluding such links, some of the URL strings in the candidate list may not represent web API calls, e.g., URLs of related or even unrelated resources.)

The Doc2Spec tool extracts (at 530) features from the received documentation regarding the extracted URL string and the documentation. The Doc2Spec tool also applies (at 540) a classification function that uses the extracted features as input to determine if the extracted URL string is a valid web API call.

The classification function is for filtering out spurious URL strings that do not represent web API calls. The classification function determines whether each extracted URL string is likely to represent a web API call based on a set of features regarding the extracted URL string and/or the documentation page from which the URL string is extracted. In some embodiments, for each extracted URL string, the Doc2Spec tool extracts the following four features of the documentation. These features specifically relate to the role of the extracted URL string within a documentation page, or the context for the URL string in the documentation page:

Clickable: The value of this feature is true if the URL string is part of the link text enclosed in <a> tags with the "href" attribute and false otherwise, i.e., whether the URL string is a hyperlink that lead to another page.

Code_tag: The value of this feature is true if the URL string appears inside <code> tags and false otherwise, i.e., whether the URL string appear between a pair of tags that defines a piece of computer code, Within_JSON: The value of this feature is true if the URL string is inside valid JavaScript Object Notation (JSON) within a pair of matched HTML tags and false otherwise.

Same_domain_with_doc_link: The value of this feature is true if the URL string has the same host name as the URL of the documentation page itself and false otherwise.

The Doc2Spec tool also extracts the following four features about the URL string itself:

Query_parameter: The value of this feature is true if the URL string contains query parameters which are denoted by '?' and/or '=' and false otherwise. For example, in the URL https://api.github.com/ . . . /issues?state=closed, "state" is a parameter with the value closed. A URL string with query parameters is more likely to be a valid web API request.

API_convention: The value of this feature is the number of conventions exhibited by the URL string for indicating whether the URL string likely corresponds to a web API call. These conventions include (1) whether the URL contains the term "rest"; (2) whether the URL contains the term "api"; and (3) whether the URL contains version related information, including the terms "v[0-9\.]+" or "version[0-9\.]+". For example, if a URL string satisfies all three conventions, the value of this feature is 3.

Path_template: The value of this feature is true if the URL string contains a path parameters denoted by enclosing brackets ({ }, [ ], ( ), < >) or a colon prefix (:) and false otherwise.

Curl_return: The Doc2Spec classifies URL strings based on their "curl" return values (i.e., the return value of "curl" command invoked on a URL string). The "curl" command is a tool that transfers data from or to a server using a supported protocol such as HTTP, HTTPS, FTP, FTPs, etc. The Doc2Spec tool classifies a URL string into one of the following categories based on the URL's "curl" return value: (1) the URL string has a curl return value that is in JSON format (i.e., the URL likely corresponds to a web API request); (2) the URL string has a curl return value that contains unauthorized errors (i.e., the URL may correspond to a web request without the proper authentication); (3) the URL string has a curl return value that is something else (e.g., the curl return value is in XML/HTML format, which likely corresponds to learning resources as opposed to web API requests.) The value of the feature "curl_return" indicates which category that the URL string belongs to based on the URL's curl return value.

The classification function determines whether an extracted URL string is likely to be an actual web API call (and hence more likely to include the base URL) by examining how well and/or to what degree do the extracted URL string and the documentation page from which the URL string is extracted exhibit the eight features listed above. In some embodiments, the classification function is trained by supervised machine learning to weigh the importance of each feature and to set detection threshold for determining whether an URL is an actual web API call. The supervised machine learning is based on training sets that include actual web API documentations and manually identified base URLs.

After applying the classification function to determine whether the extracted URL string is a valid web API call, the Doc2Spec tool determines (at 545) if there are more URL strings to extract from the documentation. If yes, the tool returns to 520 to extract and classify the next URL string from the documentation. Otherwise, the tool proceeds to 550.

At 550, the Doc2Spec tool identifies the base URL by identifying the longest common prefix from among the extracted URL strings that are classified to be actual web API calls. The process 500 then ends.

Extracting Path Templates

A path template specifies one or more paths to access a particular URL endpoint. The path template is an expression of paths to the particular endpoint that includes concatenation of path components or segments separated by delineators such as '/'. A path template may define path segments that are fixed components of a URL. A path template may also define path segments that are variables (referred to as path parameters) that can be instantiated dynamically when the corresponding web API is invoked. To identify path templates, The Doc2Spec tool crawls through a web API documentation to extract path expressions and then infers the path templates from the extracted path expressions.

In order to infer path templates, the Doc2Spec tool identifies path parameters in the extracted path expressions. Path parameters are identified based on the way they are denoted. A path parameter can be denoted explicitly via enclosing syntactic constructs (e.g., "{ }", "[ ]", "< >", or "( )"), or prefixing a path parameter using ":". The Doc2Spec tool also identifies path parameters by inferring from examples URL strings or path expressions where parameters are instantiated. For example, in the URL https://api.github.com/users/alice/gists, the path component "alice" is an instantiated value of the path parameter {userId}. The Doc2Spec tool identifies path parameters expressed syntactically by using matching operations. The Doc2Spec tool identifies path parameters inferred from examples by using an agglomerative hierarchical clustering algorithm to aggregate paths.

The clustering algorithm is an iterative algorithm that infers whether a path segment is a fixed segment of an endpoint, a path parameter, or an instantiated value. The algorithm groups paths that are inferred to invoke the same endpoint into a same cluster. For example, if the Doc2Spec tool extracts the following path expressions from the documentation for an API: "/users/{username}/repos", "/users/alice/repos", "/users/alice/received_events", and "/users/bob/received_events", the clustering algorithm would group the path expressions "/users/{username}/repos" and "/users/alice/repos" as a first cluster ("repos" cluster) and the path expressions "/users/alice/received_events" and "/users/bob/received_events" as a second cluster ("received_event" cluster). From the first cluster, the Doc2Spec tool recognizes that "alice" is an instantiated value of {user-name}. The clustering algorithm in subsequent iterations then leverages the fact that "alice" is an already inferred instantiated value and marks both "alice" and "bob" as instantiated values of the path parameter {user-name} because both "alice" and "bob" are at the same path segment in the second cluster. This inference of path parameters by recognition of instantiated values improves clustering in the next iteration by allowing different clusters of path expressions to merge based on the inferred path parameters. The hierarchical agglomerative clustering algorithm is disclosed herein as Algorithm 1:

---
Algorithm 1: Clustering Algorithm
---

Input: paths /*a set of paths that represent endpoints*/
Input: T /* Threshold for merging clusters */
Output: $c_1$, ..., $c_n$ /*each cluster $c_i$ groups the paths invoking the same endpoint*/
Function hierarchical_clustering (paths)
   clusters ← make each path a singleton cluster
   while clusters.size( ) > 1 do
     find cluster pairs $c_i$, $c_j$ with min dist($c_i$, $c_j$)
     if dist($c_i$, $c_j$) < T then
       merge cluster pair $c_i$,$c_j$
     end
   end Given a set of path expressions with the same number of segments, the clustering algorithm (algorithm 1) groups the path expressions such that path expressions in a cluster invoke the same endpoint. The hierarchical agglomerative clustering algorithm begins with one data point (i.e., one path expression) per cluster. At each iteration, the clustering algorithm calculates the distance among all the pair-wise clusters and picks the pair with the shortest distance to merge.

For some embodiments of the Doc2Spec tool, the distance between any two path expressions is calculated by a distance function "dist", which is disclosed herein as Algorithm 2:

---
Algorithm 2: Distance Function
---

Function dist($c_1$,$c_2$)
   Clusters ← make each path a singleton cluster
   if both $c_1$ and $c_2$ are singleton clusters then
     $S_1$ ← segments from the path in $c_1$
     $S_2$ ← segments from the path in $c_2$
     return dist singles($c_1$, $c_2$)
   end
   else
     return minimum dist_singles for each path pairs (p ∈ $c_1$ and q ∈ $c_2$)
   end
Function dist_singles($S_1$, $S_2$)
   if $S_1$.size( ) != $S_2$.size( ) then
     return ∞
   end
   else
     sim ← +1.0 for each i such that $S_1[i]$ and $S_2[i]$ are instantiated values
     and
     $S_1[i]=S_2[i]$
     sim ← +0.8 for each j such that one of $S_1[j]$ or $S_2[j]$ is a path parameter
     d ← $S_1$.size - sim
     return d
   end The distance function (Algorithm 2) considers two paths the "closest" if they have exactly the same segments (i.e., with same literal value for a path segment)—each matching segment i gets one point (line 16). Because two paths can never invoke the same endpoint when they have a different number of segments, the distance of such a pair is infinite (∞) and can never be in a same cluster. If the j-th segment of a path expression is a path parameter, the distance function considers the segment a match on the j-th segment of any other path expressions of the same length, with a discounted point of 0.8 instead of 1.0. The clustering algorithm stops when the next pair of clusters to merge has the distance larger than a threshold T of Algorithm 1. In some embodiments, the threshold T is set to 1, meaning that the Doc2Spec tool allows paths in a cluster to have a single path segment different from each other.

The distance function therefore limits the grouping of two path expressions into a same cluster to when a distance between the two path expressions is within a threshold distance. The distance between the two path expressions are determined based on differences between the path segments of the two path expressions at each path segment position. With the discounted point assigned to matches based on path parameters, a path segment position having a literal value and a path parameter from the two path expressions contributes more to the distance between the two path expressions than when the two path expressions have identical literal values at the path segment position, but less than when the two path expressions have different literal values at the path segment position.

To leverage already inferred instantiated values such as "alice" in the "received_events" cluster discussed above, the Doc2Spec tool uses an algorithm for inferring path parameter inferring. The algorithm for inferring path parameters is disclosed herein as Algorithm 3:

---
Algorithm 3: Algorithm for inferring path parameters
---

Input: paths /*a set of paths that represent endpoints*/
Input: T /* Threshold for merging clusters */
Output: paths /*a set of paths with locations of path parameters identified*/
values ← 0; /*the set of values of path parameters*/
prevValueSize = values.size( )

-continued

Algorithm 3: Algorithm for inferring path parameters

```
do
    prevValueSize ← values.size( )
    foreach path ∈ paths do
        annotate the segments of path as parameters if they occur in values
    end
    clusters ← hierarchical_clustering(paths)
    foreach cluster ∈ clusters do
        values.addAll(infer parameter value(cluster))
    end
while prevValueSize != values.size( );
Function infer parameter value (cluster)
    paramValues ← 0 ;
    foreach pair (path, path param) ∈ cluster do
        value ← extract the parameter value at the i-th segment in path
    where
        the i-th
        segment in path param is a parameter paramValues.add(value)
        return paramValues
    end
```

Algorithm for inferring path parameters (Algorithm 3) keeps track of a list of instantiated values of the path parameters per API ("values"). Algorithm 3 stops when no additional instantiated values are found from the function ("values.addAll(infer_parameter_value(cluster))"). Each iteration starts by updating the paths with currently known instantiated values. These paths are the input to the hierarchical agglomerative clustering algorithm ("hierarchical_clustering(paths)" calling on Algorithm 1). The clustering is performed after updating new instantiated values because when new path parameters are identified, the similarities will be updated. Thus, the clusters are updated accordingly. Within each cluster, new values of path parameters are inferred ("values.addAll(infer_parameter_value(cluster))"). Algorithm 3 would cluster the paths "/users/{username}/repos", "/users/alice/repos", "/users/alice/received_events", and "/users/bob/received_events" listed above into two path templates for two endpoints: "/users/{username}/repos" and "/users/{username}/received_events".

Figure 6:
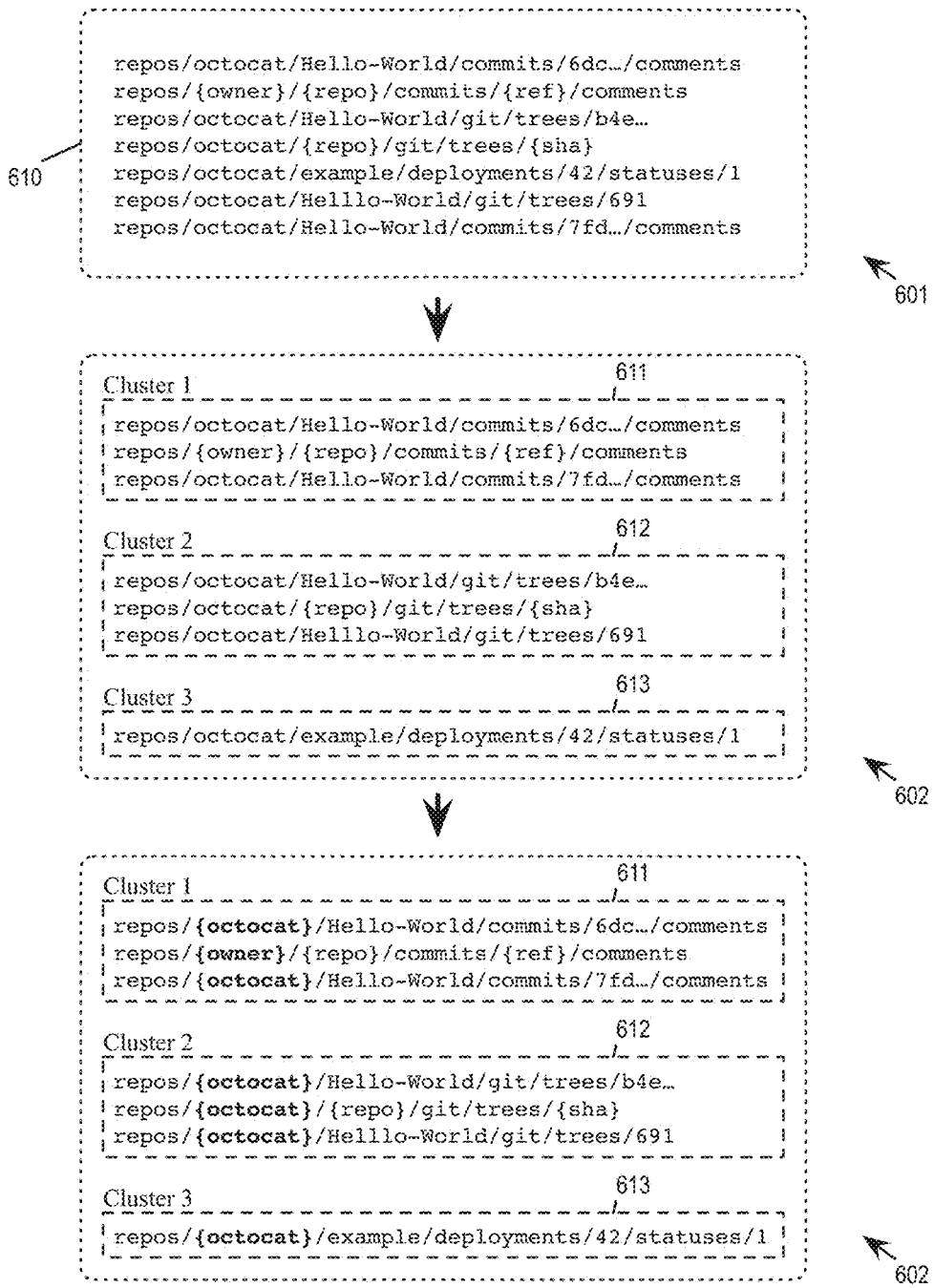
FIG. 6 illustrates the Doc2Spec tool performing clustering of path expressions for inferring path templates, consistent with an exemplary embodiment.

FIG. 6 illustrates the Doc2Spec tool performing clustering of path expressions for inferring path templates, consistent with an exemplary embodiment. For some embodiments, the Doc2Spec tool performs clustering operations at its path template generation module 460, which infers path templates based on relative URLs and absolute URLs extracted from the web API documentation. The Doc2Spec tool uses Algorithms 1-3 listed above to perform at least some of the clustering operations. The clustering operations is illustrated in three stages 601-603.

At the first stage 601, the Doc2Spec tool receives a collection of six path expressions 610 before any clustering. All of these path expressions are in the forms of relative URLs, i.e., without base URL component. Some of path expressions may be directly extracted from the web API documentation, while other path expressions may originally be absolute URLs (that are valid web API calls) with base URL components truncated off. The Doc2Spec made all path expressions into the relative URLs in order to align the various path segments when performing clustering.

The second stage 602 shows an initial clustering of the collection of path expressions 610. As illustrated, the Doc2Spec tool has grouped the path expressions into three clusters 611-613 (according to Algorithms 1 and 2). As illustrated, all path expressions grouped into cluster 611 have either the identical literal value or a path parameter (dented by { }) at each path segment position. The same is true for the cluster 612 and the cluster 613 (even through the cluster 613 has only one path expression). The cluster 613 cannot be merged with either the cluster 611 or 612 because they have different number of path segments (i.e., they have distance of infinity according to Algorithm 2). The cluster 611 and 612 cannot yet be merged because they differ at more than one path segment positions.

The third stage 603 shows the inference of an additional path parameter. For the cluster 601, the literal value "octocat" is at the same path segment position as the known path parameter {owner}, so the Doc2Spec tool is able to infer that "octocat" is likely an instantiation of a path parameter. According to Algorithm 3, the Doc2Spec tool also globally infers that "octocat" is a path parameter in other clusters as well, at least when "octocat" appears at the same path segment position. In this example, the Doc2Spec tool infers that the instances of "octocat" in cluster 602 are also instantiations of a path parameter.

Though not illustrated, the Doc2Spec tool would continue to iteratively infer additional path parameters. The additionally inferred path parameters may lead to further clustering of path expressions, since two path expressions that originally have distances greater than or equal to the threshold may have distances less than the threshold due to the additionally inferred path parameters. Further clustering may lead to additional inferred path parameters. The Doc2Spec tool stops when no additional path parameters can be inferred. The tool then produces a path template for each cluster based on the path expressions aggregated in that cluster.

Figure 7:
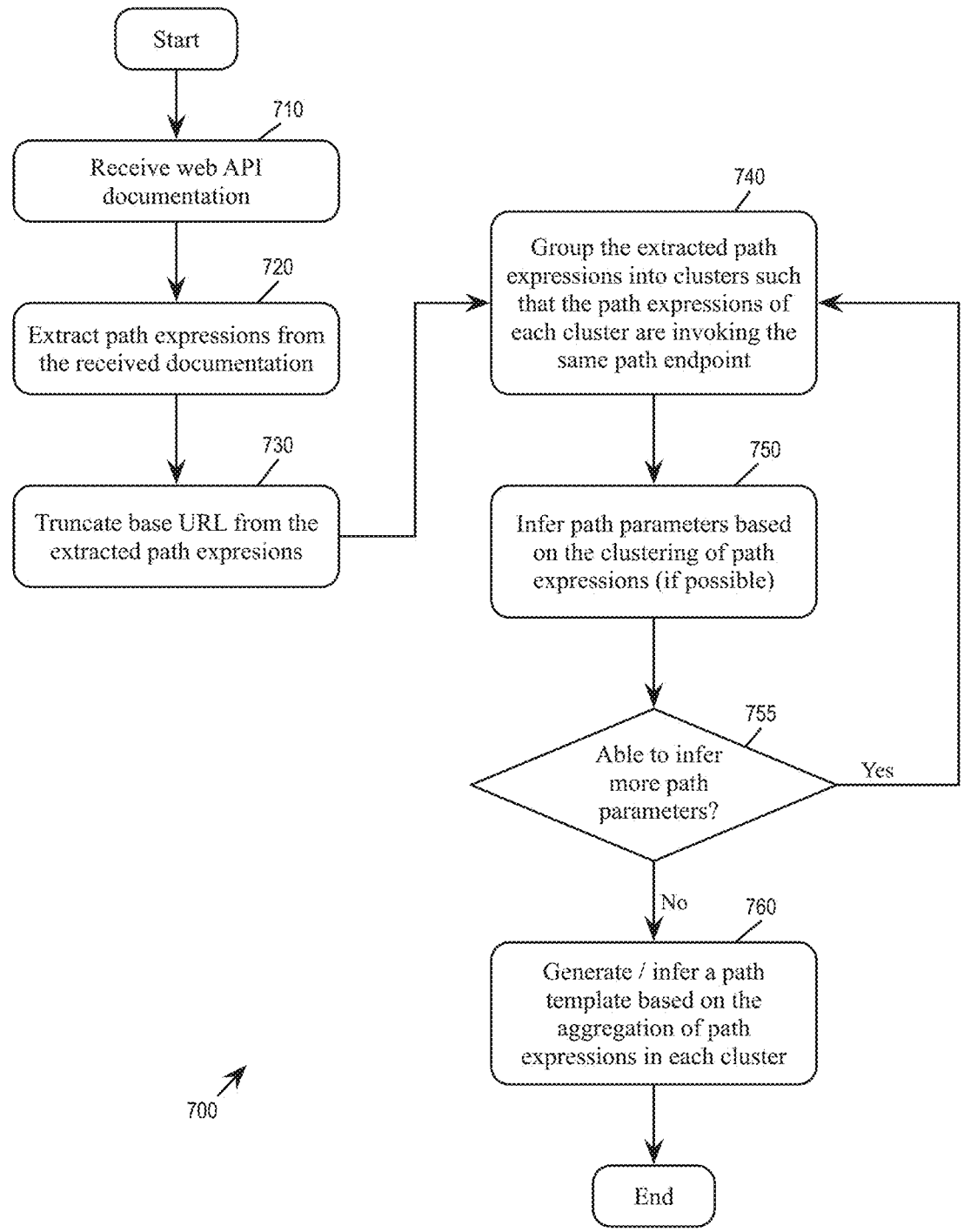
FIG. 7 conceptually illustrates an example process for inferring path parameters and path templates by clustering path expressions extracted from a web API documentation.

FIG. 7 conceptually illustrates an example process 700 for inferring path parameters and path templates by clustering path expressions extracted from a web API documentation. In some embodiments, one or more processing units of a computing device implementing the Doc2Spec tool (e.g., the computing device 150) perform the process 700.

The Doc2Spec tool starts the process 700 when it receives (at 710) a web API documentation. The Doc2Spec tool extracts (at 720) path expressions by crawling the received documentation. These extracted path expressions may include relative URLs and absolute URLs that include the base URL. The Doc2Spec tool truncates (at 730) the base URL from the extracted path expressions, particularly the absolute URLs that include the base URL. In some embodiments, the Doc2Spec tool performs the process 500 in order to provide the base URL and the extract absolute URLs. In some embodiments, the Doc2Spec tool performs the operations 720 and 730 by using the relative path extraction module 470 and the absolute path extraction module 450.

The Doc2Spec tool groups (at 740) the extracted path expressions into clusters such that the path expressions in the same cluster are invoking the same path endpoint. In some embodiments, the Doc2Spec tool uses the agglomerative hierarchical clustering algorithm (Algorithms 1 and 2) to aggregate path expressions. The Doc2Spec tool also infers (at 750) path parameters based on the clustering of the path expressions, if possible. In some embodiments, the Doc2Spec tool uses the algorithm for inferring path parameters (Algorithm 3) to infer path parameters across different clusters.

The Doc2Spec tool determines (at 755) whether it was able to infer any new path parameter during this iteration. If so, the Doc2Spec tool returns to 740 to perform another iteration of clustering of path expressions based on the newly inferred path parameters. If the Doc2Spec tool was not able to infer any new path parameters during this iteration, the iterative clustering ends and the tool proceeds to 760.

At 760, the Doc2Spec tool generates (or infers) path templates based on the aggregation of path expressions in each cluster. The generated path template of a cluster is the template for invoking the common endpoint of the path expressions in the cluster. The process 700 then ends.

Extracting Descriptions

In a web API documentation, URL strings or path expressions are typically co-located with their descriptions, which contains useful information for a web API specification, information such as valid HTTP request types to use with a path template (GET, PUT, DELETE . . . ) and query parameters to use in a web API call. This other information is referred to as the context or the description block of the path expressions in the documentation. For each path expression or URL string, the Doc2Spec tool locates the scope of its description block from the HTML source of the documentation pages. If there are multiple path expressions in the documentation pages that match a particular path template, the Doc2Spec tool combines the description blocks of the matching path expressions as the description block of the particular path template.

Figure 8:
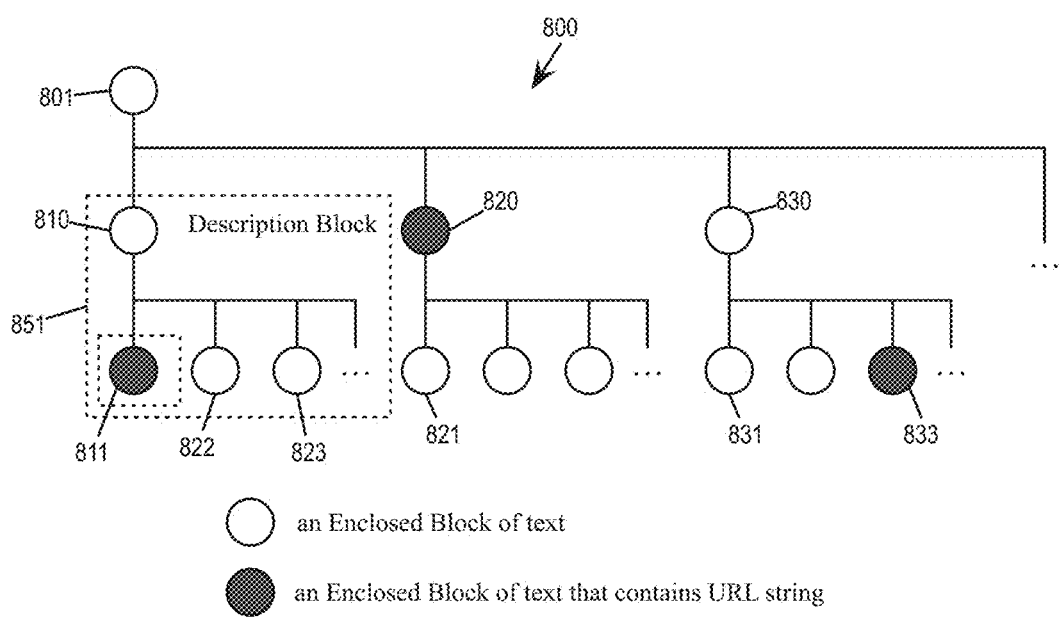
FIG. 8 conceptually illustrates the locating of a description block for a path expression or URL string, consistent with an exemplary embodiment.

FIG. 8 conceptually illustrates the locating of a description block for a path expression or URL string, consistent with an exemplary embodiment. In some embodiments, the Doc2Spec tool parses the web API documentation page into a document object model (DOM) tree, with each node representing the rendered text from the fragment of the HTML page enclosed in a pair of matched tags. The Doc2Spec uses the constructed DOM tree to locate the description blocks for URL strings and path expressions in the web API documentation.

FIG. 8 illustrates a DOM tree 800 that is constructed based on the web API documentation 110 of FIG. 1. As mentioned above, API documentation such as the documentation 110 is a rendered document based on HTML, which has enclosure indicators such as matching tags or brackets that enclose text and information into various enclosed blocks. An enclosed block may also enclose one or more nested enclosed blocks. Each node of the DOM tree 800 represents rendered text from a fragment of the API documentation page 110 that is enclosed by matching tags in HTML (i.e., enclosed block). A parent node and its child node in the DOM tree (e.g., parent node 810 and child node 811) respectively represent an enclosed block and a nested block enclosed within (e.g., the enclosed block 111 and nested block 114). DOM nodes that are illustrated as darkened, such as nodes 811, 820 and 833, are nodes that correspond to enclosed blocks or fragments that include a URL string or a path expression.

The figure illustrates the identification of the description block for the DOM node 811 by traversing the DOM tree 800. To find the description block for a particular node that includes an URL string, the Doc2Spec tool starts from the particular node and follows the DOM tree structure to include the particular node's sibling nodes and ancestor nodes until it encounters an ancestor node of another DOM node that includes a URL string. In the illustrated example, the Doc2Spec tool expands the description block 851 of the DOM node 811 to include sibling nodes 812 and 813, and then to ancestor node 810. The expansion of the description block of the DOM node 811 stops before reaching the DOM nodes 801 since the node 801 is an ancestor node of other URL containing nodes (820 and 833).

Figure 9:
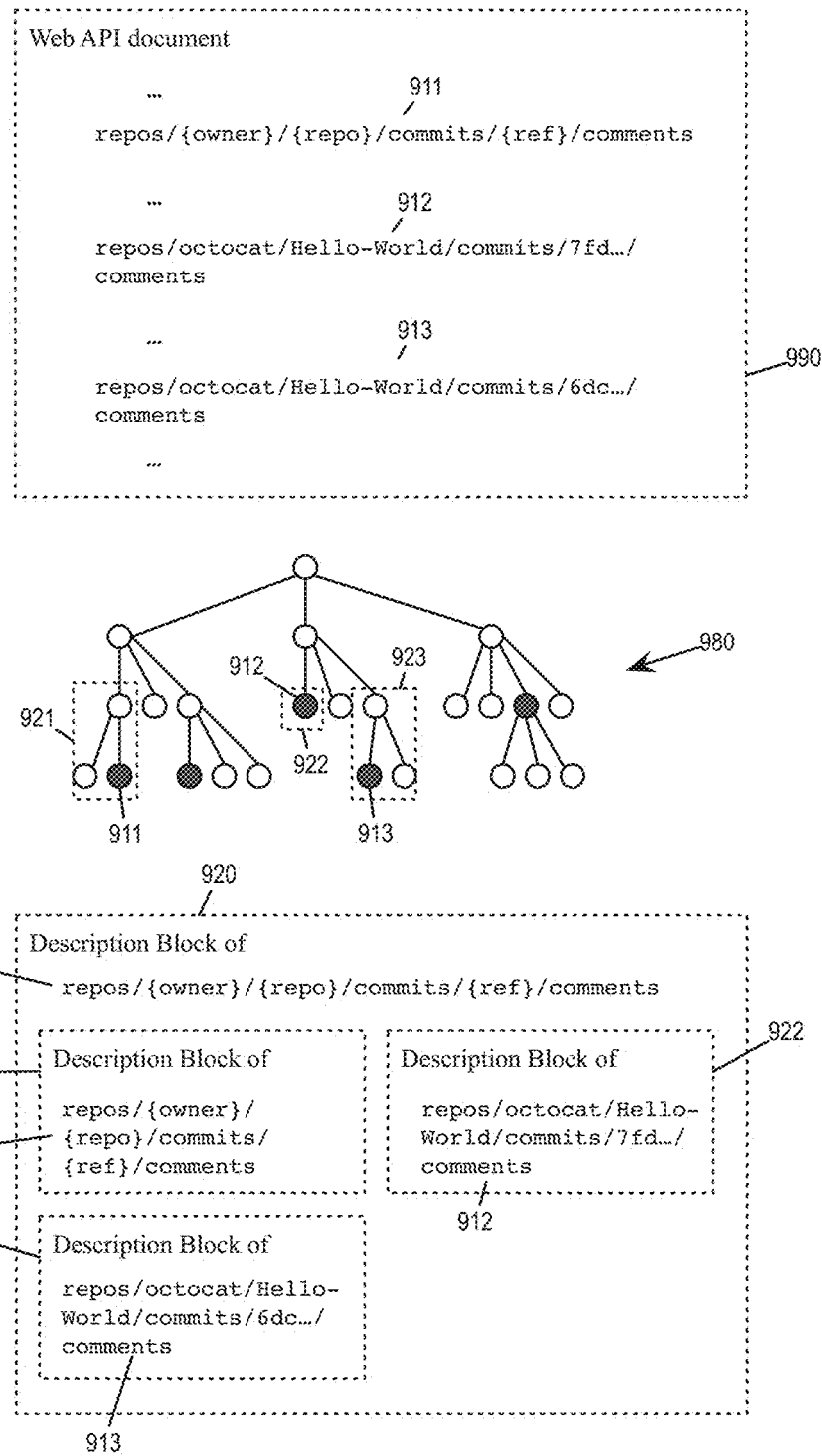
FIG. 9 conceptually illustrates the combination of description blocks of individual path expressions or URL strings into a description block of a path template, consistent with an exemplary embodiment.

FIG. 9 conceptually illustrates the combination of description blocks of individual path expressions or URL strings into a description block of a path template, consistent with an exemplary embodiment. The figure illustrates the identification of a description block for a path template 910. The path template 910 is aggregated from three different path expressions 911-913 (by using the hierarchical clustering algorithms described above).

The path expressions 911-913 are extracted from a web API document 990, based on which the Doc2Spec tool constructed a DOM tree 980. The DOM tree 980 contains nodes that corresponds to the path expressions 911-913 (illustrated as darkened). By using the DOM tree 980, the Doc2Spec tool has identified a description block 921 for the path expression 911, a description block 922 for the path expression 912, and a description block 923 for the path expression 913. Since the path template 910 is an aggregation of the path expressions 911-913, the Doc2Spec tool combines the description blocks 921-923 into a combine description block 920 for the path template 910.

Having identified description blocks and associated them with path templates, the Doc2Spec tool searches the description blocks for the possible method names such as "GET", "POST", "PUT", "DELETE", "OPTIONS", "HEAD", and "PATCH". In some embodiments, if none of these names is found, Doc2Spec uses "GET" as the default value for HTTP request type of an URL endpoint, since the "GET" method is the most popular method for web APIs.

The Doc2Spec tool also extracts possible query parameters to associate with endpoints that are represented by path templates. In some embodiments, the Doc2Spec tool checks whether the URL strings or path expressions in the original documentation contain query parameters. The query parameters may be in a form of a query string included within a URL string or path expression, denoted by using the "?" character. If a query parameter is identified based on the "?" character, Doc2Spec parses the query string to obtain the names of the query parameters and also possibly example values.

In addition to obtaining query parameters from query strings having "?" character, the Doc2Spec tool also attempts to obtain query parameters from tables or plain text. The Doc2Spec tool locates tables within the description blocks of path expressions based on HTML tags such as <tb> and </tb>. For the cases in which there are multiple tables within one description block, Doc2Spec selects the table whose title or the first row contains keywords such as 'parameter', 'field' and 'type'. After a table that describes query parameters is identified, Doc2Spec extracts the name and the type of each query parameter from the table.

Figure 10:
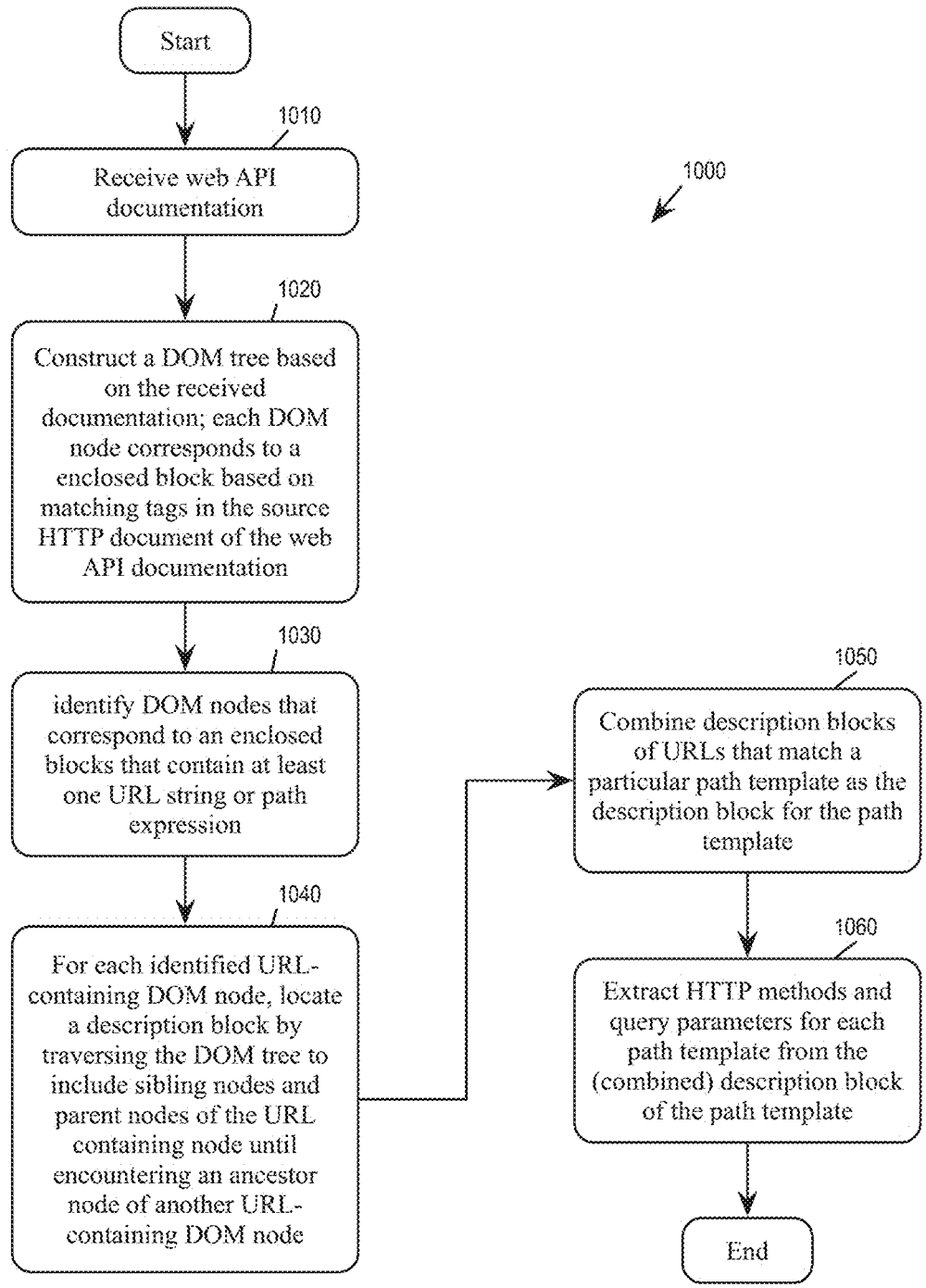
FIG. 10 conceptually illustrates an example process for extracting HTTP request types and query parameters from a web API documentation and associating the extracted HTTP request types and query parameters with the corresponding path templates.

FIG. 10 conceptually illustrates an example process 1000 for extracting HTTP request types and query parameters from a web API documentation and associating the extracted HTTP request types and query parameters with the corresponding path templates. In some embodiments, one or more processing units of a computing device (e.g., the computing device 150) perform the process 1000 when implementing the Doc2Spec tool 100.

The Doc2Spec tool starts the process 1000 when it receives (at 1010) a web API documentation. In some embodiments, the Doc2Spec tool crawls the web API documentation by starting from a seed page of the web API document and iteratively downloads all linked subpages. The receive documentation includes source HTML document. The tool then constructs (at 1020) a DOM tree based on the received documentation. Each node in the DOM tree corresponds to an enclosed block of text based on matching tags in the source HTML document. The tool then identifies (at 1030) DOM nodes in the tree that correspond to enclosed blocks in the source HTML that each contains at least one URL (URL string or path expression). In FIGS. 8 and 9, these URL-containing nodes are illustrated as darkened. In some embodiments, the Doc2Spec tool 100 performs the operations 1010, 1020, and 1030 by using its endpoint description extraction module 480.

For each identified URL-containing node, the Doc2Spec tool locates (at 1040) or identifies a description block by traversing DOM tree to include sibling nodes and parent nodes of the URL-containing node until encountering an ancestor node of another URL-containing DOM node. This identifies the scope of the description block associated with the URL in the HTML fragment of the DOM node. The identification of a description block for a URL is described by reference to FIG. 8 above. In some embodiments, the Doc2Spec tool 100 performs the operation 1040 by using its endpoint description extraction module 480.

The Doc2Spec tool then combines (at 1050) the description blocks of the URLs that match a particular path template as the description block of the particular path template. The identification of a (combined) description block for a path template is described by reference to FIG. 9 above.

The Doc2Spec tool extracts (at 1060) HTTP request types and query parameters for each path template from the (combined) description block of the path template. The process 1000 extracts HTTP request types by searching the description blocks for the possible method names such as "GET", "POST", "PUT", "DELETE", "OPTIONS", "HEAD", and "PATCH". The tool extracts query parameters by looking for query strings with a particular character (e.g., "?") or tables with certain keywords such as "field", "parameter", and "type". The extracted HTTP request types and query parameters are then associated with the path template of the description block. In some embodiments, the Doc2Spec tool extracts the HTTP request types and the query parameters by using its HTTP request type extraction module 482 and its query parameter extraction module 484. The process 1000 then ends.

Figure 11:
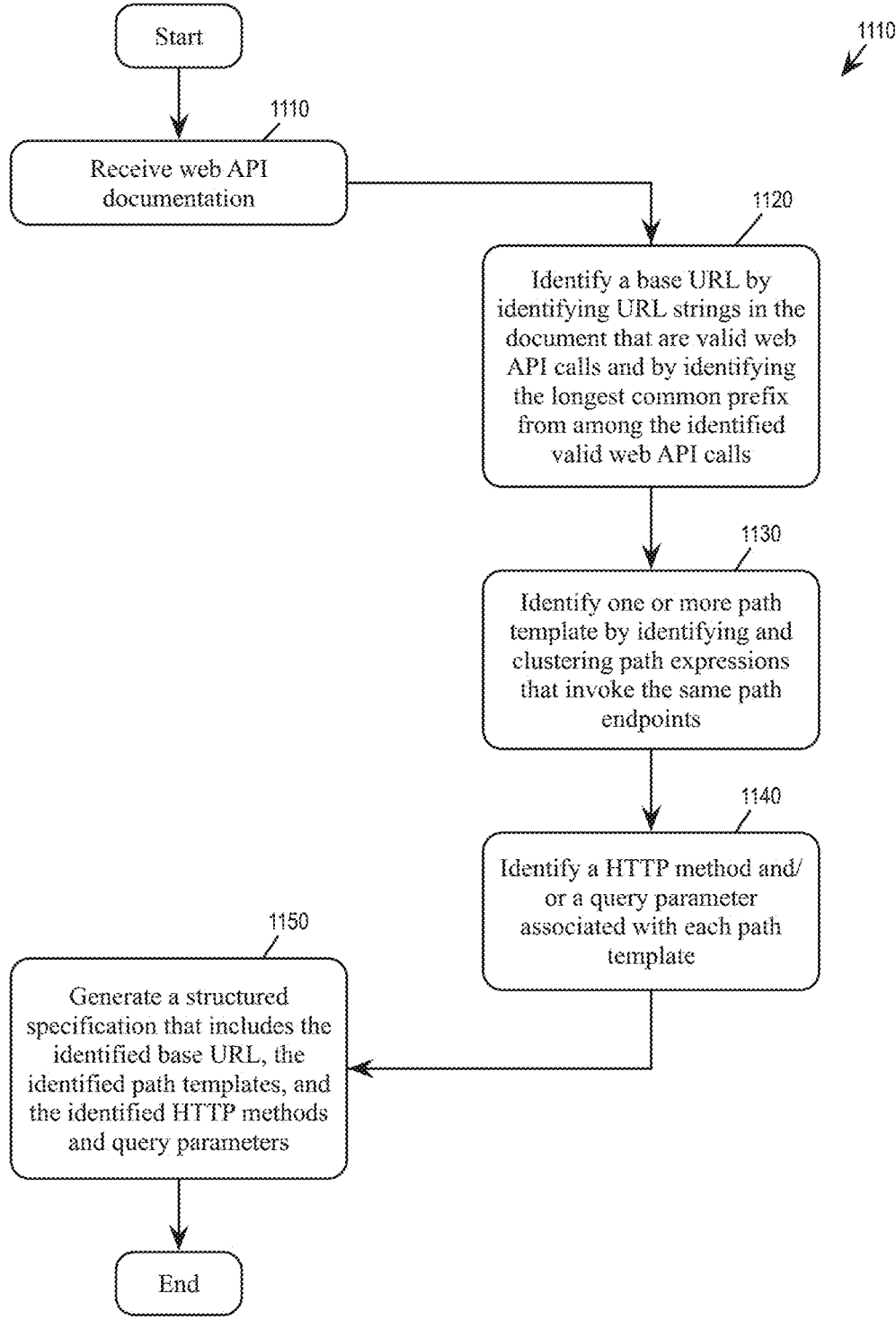
FIG. 11 conceptually illustrates an example process for assembling a web API specification from a web API documentation.

FIG. 11 conceptually illustrates an example process 1100 for assembling a web API specification from a web API documentation. In some embodiments, one or more processing units of a computing device (e.g., the computing device 150) perform the process 1000 when implementing the Doc2Spec tool 100. The tool performs the process 1100 to extracts and/or infers base URL, path templates, and associated HTTP request types and query parameters from the web API documentation of arbitrary format. The extracted information is placed in the constructed web API specification according to a designated format such as OpenAPI.

The Doc2Spec tool starts the process 1100 by receiving (at 1110) a web API documentation. In some embodiments, the Doc2Spec tool crawls the web API documentation by starting from a seed page of the web API document and iteratively downloads all linked subpages.

The Doc2Spec tool identifies (at 1120) a base URL by identifying URL strings and path expressions in the documentation that are valid web API calls and by identifying the longest common prefix from among the identified valid web API calls. In some embodiments, the Doc2Spec tool performs the operation 1120 by performing the process 500 of FIG. 5.

The Doc2Spec tool also identifies (at 1130) or infers one or more path templates by identifying and clustering path expressions in the documentation that invoke the same path endpoints. The clustering allows the tool to identify path parameters and aggregating path expressions. For any two path expressions, the tool determines if they should be grouped into a same cluster by comparing their respective path segments at every path segment position. For each path segment position, the tool determines whether the path segment is a fixed segment of an endpoint, a path parameter (variable), or an instantiated value. Two path expressions are assigned to a same cluster if at every path segment position, the two path expression have either matching literal values, or if at least one of the path expression has a path parameter at the path segment position. The tool leverages identified path parameters to identify more path parameters and to further merge path expressions into clusters. In some embodiments, the Doc2Spec tool performs the operation 1130 by using Algorithms 1-3 and/or by performing the process 700 of FIG. 7.

The Doc2Spec tool also identifies (at 1140) HTTP request type and query parameters that are associated with each identified path template, specifically by extracting this information from a description block that is associated with the path template. The identification of a description block for a path template is described by reference to FIGS. 8 and 9 above. The tool extracts HTTP request types by searching the description blocks for the possible method names such as "GET" or "PUT". The tool extracts query parameters by searching the description block for query strings with a particular character (e.g., '?') or tables with particular keywords. In some embodiments, the Doc2Spec tool performs the operation 1140 by performing the process 1000 of FIG. 10.

The Doc2Spec tool generates (at 1150) a structured specification (i.e., the web API specification) that includes the identified base URL, the identified path templates, and the identified HTTP request types and query parameters. The identified base URL, the identified path templates, and the identified HTTP request types and query parameters are stored in the structured specification according to a designated format such as OpenAPI. The process 1100 then ends.

Example Electronic System

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIGS. 5, 7, 10, and 11) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
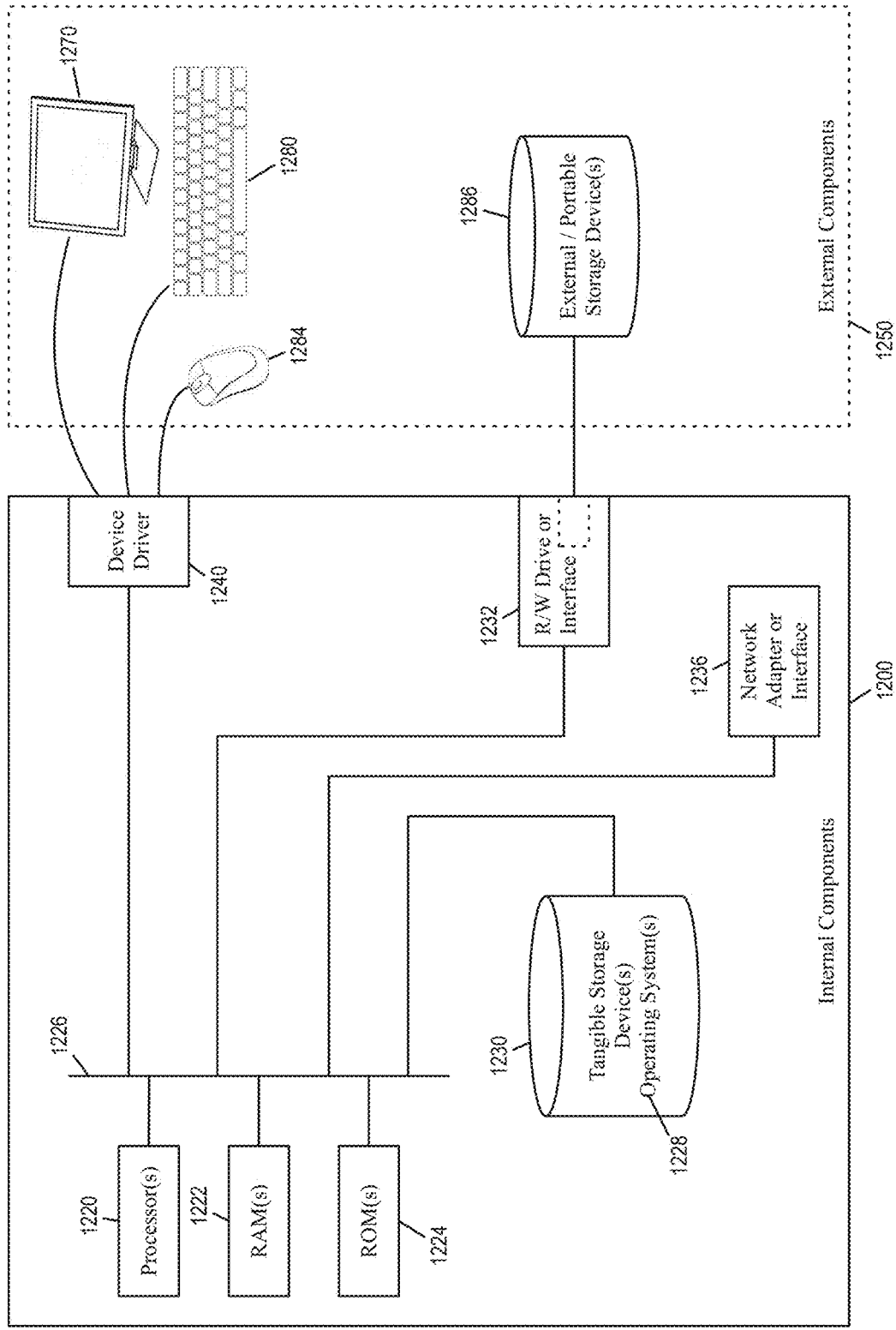
FIG. 12 shows a block diagram of the components of a data processing system in accordance with an illustrative embodiment of the present disclosure.

FIG. 12 shows a block diagram of the components of data processing systems 1200 and 1250 that may be used to implement a tool for constructing a web API specification from a web API documentation (i.e., the Doc2Spec tool 100) in accordance with an illustrative embodiment of the present disclosure. It should be appreciated that FIG. 12 provides only an illustration of one implementation and does not imply any limitations with regard to the environments in which different embodiments may be implemented. Many modifications to the depicted environments may be made based on design and implementation requirements.

Data processing systems 1200 and 1250 are representative of any electronic device capable of executing machine-readable program instructions. Data processing systems 1200 and 1250 may be representative of a smart phone, a computer system, PDA, or other electronic devices. Examples of computing systems, environments, and/or configurations that may represented by data processing systems 1200 and 1250 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 1200 and 1250 may include a set of internal components 1200 and a set of external components 1250 illustrated in FIG. 12. The set of internal components 1200 includes one or more processors 1220, one or more computer-readable RAMs 1222 and one or more computer-readable ROMs 1224 on one or more buses 1226, and one or more operating systems 1228 and one or more computer-readable tangible storage devices 1230. The one or more operating systems 1228 and programs such as the programs for executing the process 700 are stored on one or more computer-readable tangible storage devices 1230 for execution by one or more processors 1220 via one or more RAMs 1222 (which typically include cache memory). In the embodiment illustrated in FIG. 12, each of the computer-readable tangible storage devices 1230 is a magnetic disk storage device of an internal hard drive. Alternatively, each of the computer-readable tangible storage devices 1230 is a semiconductor storage device such as ROM 1224, EPROM, flash memory or any other computer-readable tangible storage device that can store a computer program and digital information.

The set of internal components 1200 also includes a R/W drive or interface 1232 to read from and write to one or more portable computer-readable tangible storage devices 1286 such as a CD-ROM, DVD, memory stick, magnetic tape, magnetic disk, optical disk or semiconductor storage device. The instructions for executing the process 700 can be stored on one or more of the respective portable computer-readable tangible storage devices 1286, read via the respective R/W drive or interface 1232 and loaded into the respective hard drive 1230.

The set of internal components 1200 may also include network adapters (or switch port cards) or interfaces 1236 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 1236. From the network adapters (or switch port adaptors) or interfaces 1236, the instructions and data of the described programs or processes are loaded into the respective hard drive 1230. The network may comprise copper wires, optical fibers, wireless transmission, routers, firewalls, switches, gateway computers and/or edge servers.

The set of external components 1250 can include a computer display monitor 1270, a keyboard 1280, and a computer mouse 1284. The set of external components 1250 can also include touch screens, virtual keyboards, touch pads, pointing devices, and other human interface devices. The set of internal components 1200 also includes device drivers 1240 to interface to computer display monitor 1270, keyboard 1280 and computer mouse 1284. The device drivers 1240, R/W drive or interface 1232 and network adapter or interface 1236 comprise hardware and software (stored in storage device 1230 and/or ROM 1224).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Example Characteristics

On-demand self-service: a cloud consumer can unilaterally provision computing capabilities, such as server time and network storage, as needed—automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Example Service Models

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud computing is an infrastructure that includes a network of interconnected nodes.

Figure 13:
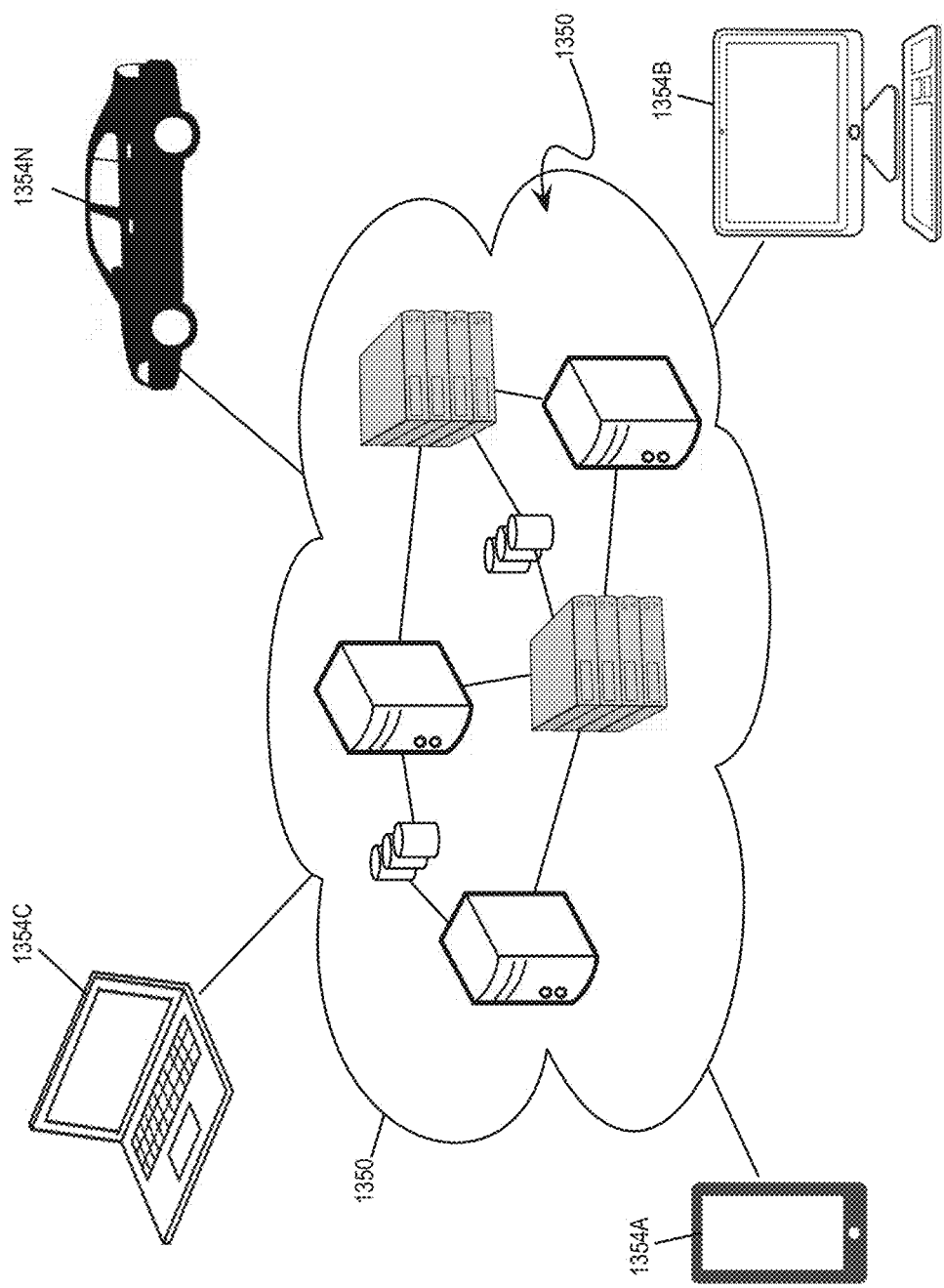
FIG. 13 illustrates an example cloud-computing environment.

Referring now to FIG. 13, an illustrative cloud computing environment 1350 is depicted. As shown, cloud computing environment 1350 includes one or more cloud computing nodes 1310 with which local computing devices used by cloud consumers, such as, for example, personal digital assistant (PDA) or cellular telephone 1354A, desktop computer 1354B, laptop computer 1354C, and/or automobile computer system 1354N may communicate. Nodes 1310 may communicate with one another. They may be grouped (not shown) physically or virtually, in one or more networks, such as Private, Community, Public, or Hybrid clouds as described hereinabove, or a combination thereof. This allows cloud computing environment 1350 to offer infrastructure, platforms and/or software as services for which a cloud consumer does not need to maintain resources on a local computing device. It is understood that the types of computing devices 1354A-N shown in FIG. 13 are intended to be illustrative only and that computing nodes 1310 and cloud computing environment 1350 can communicate with any type of computerized device over any type of network and/or network addressable connection (e.g., using a web browser).

Figure 14:
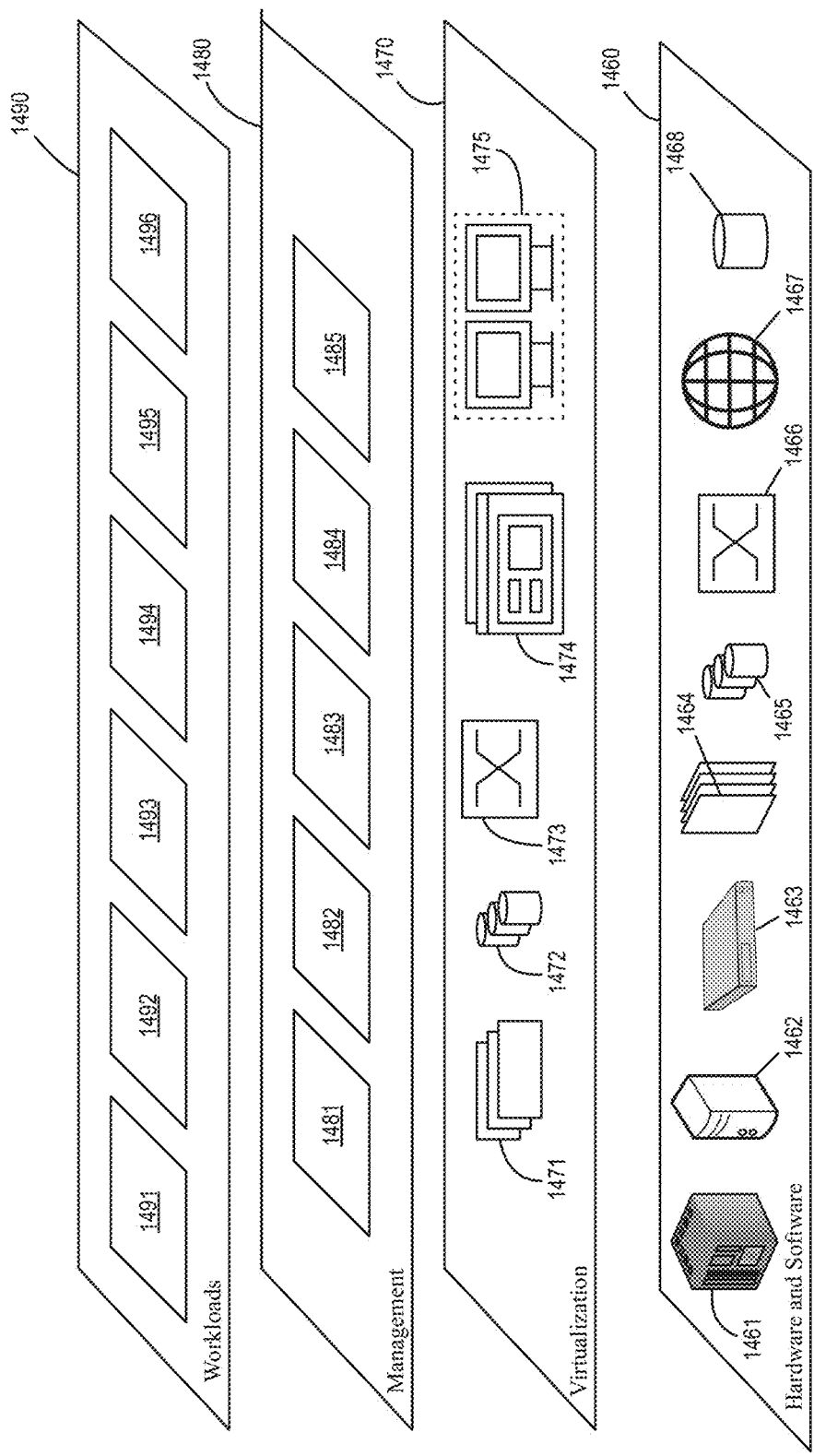
FIG. 14 illustrates a set of functional abstraction layers provided by a cloud-computing environment, consistent with an exemplary embodiment.

Referring now to FIG. 14, a set of functional abstraction layers provided by cloud computing environment 1350 (of FIG. 13) is shown. It should be understood that the components, layers, and functions shown in FIG. 14 are intended to be illustrative only and embodiments of the disclosure are not limited thereto. As depicted, the following layers and corresponding functions are provided:

Hardware and software layer 1460 includes hardware and software components. Examples of hardware components include: mainframes 1461; RISC (Reduced Instruction Set Computer) architecture based servers 1462; servers 1463; blade servers 1464; storage devices 1465; and networks and networking components 1466. In some embodiments, software components include network application server software 1467 and database software 1468.

Virtualization layer 1470 provides an abstraction layer from which the following examples of virtual entities may be provided: virtual servers 1471; virtual storage 1472; virtual networks 1473, including virtual private networks; virtual applications and operating systems 1474; and virtual clients 1475.

In one example, management layer 1480 may provide the functions described below. Resource provisioning 1481 provides dynamic procurement of computing resources and other resources that are utilized to perform tasks within the cloud computing environment. Metering and Pricing 1482 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1483 provides access to the cloud-computing environment for consumers and system administrators. Service level management 1484 provides cloud computing resource allocation and management such that required service levels are met. Service Level Agreement (SLA) planning and fulfillment 1485 provide pre-arrangement for, and procurement of, cloud computing resources for which a future requirement is anticipated in accordance with an SLA.

Workloads layer 1490 provides examples of functionality for which the cloud computing environment may be utilized. Examples of workloads and functions which may be provided from this layer include: mapping and navigation 1491; software development and lifecycle management 1492; virtual classroom education delivery 1493; data analytics processing 1494; transaction processing 1495; and API documentation to specification tool 1496. In some embodiments, the workload 1496 performs the operations of the Doc2Spec tool 100.

The foregoing one or more embodiments implements a tool for constructing a web API specification within a computer infrastructure by having one or more computing devices extracting information from a web API documentation and performing computations to construct the web API specification based on the extracted information.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising:
one or more non-transitory computer-readable storage device and program instructions stored on at least one of the one or more non-transitory storage devices, the program instructions executable by a processor, the program instructions comprising sets of instructions for:
receiving a web application programming interface (API) documentation in arbitrary form;
extracting a base uniform resource locator (URL) string from the received web API documentation by identifying URL strings in the web API documentation that are determined to be valid API calls by way of a classification function that uses features of a given URL string as input to determine if the given URL string is a valid web API call;
inferring one or more path template by identifying and clustering path expressions in the web API documentation that invoke the same URL endpoints, by way of an agglomerative hierarchical clustering algorithm that infers path parameters by iteratively determining whether a path segment is a fixed segment of an endpoint, a path parameter, or an instantiated value;

extracting a hypertext transfer protocol (HTTP) request type and a query parameter associated with at least one path template; and generating a specification comprising the extracted base URL string, the inferred path template, the extracted HTTP request type, and the extracted query parameter.

2. The computer program product of claim 1, wherein the set of instructions for identifying whether a URL string is a valid web API call comprises a set of instructions for classifying the URL string based on a set of features of the URL string and a set of features regarding a documentation page from which the URL string is extracted.

3. The computer program product of claim 2, wherein the set of instructions for classifying the URL string based on the set of features of the URL string comprises a set of instructions for determining whether the URL string includes a path parameter, a query string, a version number, or a sub string indicating an API call.

4. The computer program product of claim 2, wherein the set of instructions for classifying the URL string comprises a set of instructions for executing a command that transfers data from or to a server based on the URL string and classifying the URL string based on a return value of the command.

5. The computer program product of claim 2, wherein the set of features of the URL string comprises a context for the URL string in the documentation.

6. The computer program product of claim 5, wherein the context of the URL string is at least one of:
   whether the URL string is a hyperlink that leads to another web page,
   whether the URL string appear between a pair of tags that defines a piece of computer code,
   whether the URL string is in valid JavaScript Object Notation (JSON) within a pair of matched Hypertext Markup Language (HTML) tags, and
   whether the URL string has a same host name as the URL of the documentation.

7. The computer program product of claim 1, wherein the set of instructions for extracting the base URL string comprises a set of instructions for identifying a longest common prefix from among the identified URL strings that are valid web API calls.

8. The computer program product of claim 1, wherein the set of instructions for inferring a path template by identifying and clustering path expressions comprises a set of instructions for inferring path parameters within each cluster and using the inferred path parameters to further identify and cluster path expressions.

9. The computer program product of claim 1, wherein the set of instructions for identifying and clustering path expressions that invoke the same URL endpoints comprises a set of instructions for determining whether each segment of each path expression is a fixed segment of an endpoint, a path parameter, or an instantiated value of a path parameter.

10. A computer program product comprising:
   one or more non-transitory computer-readable storage device and program instructions stored on at least one of the one or more non-transitory storage devices, the program instructions executable by a processor, the program instructions comprising sets of instructions for:
   receiving a web application programming interface (API) documentation in arbitrary form;
   extracting path expressions from the received web API documentation, each path expression comprising a plurality of path segments;
   identifying URL strings in the web API documentation that are determined to be valid API calls by way of a classification function that uses features of a given URL string as input to determine if the given URL string is a valid web API call;
   grouping the extracted path expressions into one or more clusters by way of a clustering algorithm,
      wherein first and second path expressions are grouped into a same cluster when a distance between the first and second path expressions is within a threshold distance, and
      wherein the distance between the first and second path expressions is determined based on differences between the path segments of the first path expression and the path segments of the second path expression at each path segment position;
   inferring a path template from each cluster by way of an agglomerative hierarchical clustering algorithm that infers path parameters by iteratively determining whether a path segment is a fixed segment of an endpoint, a path parameter, or an instantiated value; and
   generating a specification comprising the inferred path template.

11. The computer program product of claim 10, wherein first and second path expressions are not grouped to a same cluster when the first path expression and the second path expression each has a different number of path segments.

12. The computer program product of claim 10, wherein a literal value and a path parameter at a path segment position contributes more to the distance between the first and second path expressions than two identical literal values at the path segment position.

13. The computer program product of claim 10, wherein a literal value and a path parameter at a path segment position contributes less to the distance between the first and second path expressions than two different literal values at the path segment position.

14. The computer program product of claim 10, wherein each cluster of path expressions invokes a same universal resource locator (URL) endpoint.

15. The computer program product of claim 10, wherein the programming instructions further comprising a set of instructions for inferring path parameters in path expressions and grouping path expressions into clusters based on the inferred path parameters.

16. The computer program product of claim 10, wherein the programming instructions further comprising a set of instructions for determining whether each path segment of each path expression is a fixed segment of a URL endpoint, a path parameter, or an instantiated value of a path parameter.

17. A computing device comprising:
   a set of one or more processing units; and
   a storage device storing a set of instructions, wherein an execution of the set of instructions by the set of processing units configures the computing device to perform acts comprising:
   receiving a web application programming interface (API) documentation in arbitrary form;
   extracting a base uniform resource locator (URL) string from the received documentation by identifying URL strings in the documentation that are determined to be valid web API calls by way of a classification function that uses features of a given URL string as input to determine if the given URL string is a valid web API call;

inferring one or more path template by identifying and clustering path expressions in the web API documentation that invoke the same URL endpoints, by way of an agglomerative hierarchical clustering algorithm that infers path parameters by iteratively determining whether a path segment is a fixed segment of an endpoint, a path parameter, or an instantiated value;

extracting a hypertext transfer protocol (HTTP) request type and a query parameter associated with at least one path template; and generating a specification comprising the extracted base URL, the inferred path template, the extracted HTTP request type, and the extracted query parameter.

18. The computing device of claim 17, wherein identifying whether a URL string is a valid web API call comprises classifying the URL string based on a set of features of the URL string and a set of features regarding a documentation page from which the URL string is extracted.

19. The computing device of claim 17, wherein:
the execution of the set of instructions by the set of processing units further configures the computing device to perform the acts of:

constructing a document object model (DOM) tree that represents the documentation, wherein extracting an HTTP request type and a query parameter of the path template comprises using the DOM tree to identify a description block for the path template and extracting the HTTP request type and the query parameter associated with the path template from the description block for the path template.

20. The computing device of claim 19, wherein:
the description block of the path template is a combined description block based on a first description block of a first path expression and a second description of block of a second path expression;

the first description block is identified by traversing the DOM tree from a first DOM node that represents a first fragment of the documentation that includes the first path expression; and the second description block is identified by traversing the DOM tree from a second DOM node that represents a second fragment of the documentation that includes the second path expression.

* * * * *